United States Patent
Palmer

(10) Patent No.: US 12,524,339 B2
(45) Date of Patent: Jan. 13, 2026

(54) LOGICAL-TO-PHYSICAL TABLE COMPRESSION USING AN EXCEPTION LIST AND A LOGICAL TREE

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/643,514

(22) Filed: Apr. 23, 2024

(65) Prior Publication Data

US 2024/0370365 A1 Nov. 7, 2024

Related U.S. Application Data

(60) Provisional application No. 63/500,084, filed on May 4, 2023.

(51) Int. Cl.
*G06F 12/02* (2006.01)
*G06F 3/06* (2006.01)

(52) U.S. Cl.
CPC ........ *G06F 12/0246* (2013.01); *G06F 3/0608* (2013.01); *G06F 3/064* (2013.01); *G06F 3/0688* (2013.01); *G06F 12/0292* (2013.01); *G06F 2212/1044* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 9,959,204 | B1 * | 5/2018 | Lott | G06F 7/24 |
| 10,810,132 | B1 * | 10/2020 | Van Gaasbeck | G06F 12/0246 |
| 11,836,074 | B2 * | 12/2023 | Palmer | G06F 12/0246 |
| 2012/0210041 | A1 * | 8/2012 | Flynn | H05K 7/1444 |
| | | | | 711/3 |
| 2013/0080732 | A1 * | 3/2013 | Nellans | G06F 12/0246 |
| | | | | 711/206 |
| 2021/0240627 | A1 * | 8/2021 | Jin | G06F 11/076 |

(Continued)

OTHER PUBLICATIONS

Pat Morin. Open Data Structures. 2013. AU Press. pp. 29-61, 133-151, 185-210.*

*Primary Examiner* — Nathan Sadler
(74) *Attorney, Agent, or Firm* — Harrity & Harrity, LLP

(57) ABSTRACT

In some implementations, a memory apparatus may receive a command indicating a logical block address (LBA) that is associated with a logical-to-physical (L2P) table. The memory apparatus may perform a lookup operation associated with a compressed version of an address range of the L2P table to identify a physical address in non-volatile memory associated with the LBA, wherein the compressed version is stored in a volatile memory of the memory apparatus, wherein the compressed version is associated with an exception list that indicates physical addresses for respective LBAs, included in the address range, that are associated with non-sequential physical addresses, and wherein the compressed version is associated with a binary tree that indicates locations in the exception list associated with the respective LBAs. The memory apparatus may perform, based on the command, an action associated with the physical address.

20 Claims, 11 Drawing Sheets

(56) References Cited

U.S. PATENT DOCUMENTS

| | | | |
|---|---|---|---|
| 2021/0406185 A1* | 12/2021 | Guda | G06F 12/0864 |
| 2022/0107886 A1* | 4/2022 | Palmer | G06F 12/0246 |
| 2022/0147249 A1* | 5/2022 | Zimmerman | G06F 12/0292 |
| 2024/0385958 A1* | 11/2024 | Palmer | G06F 12/0246 |

* cited by examiner

LOGICAL-TO-PHYSICAL TABLE COMPRESSION USING AN EXCEPTION LIST AND A LOGICAL TREE

CROSS REFERENCE TO RELATED APPLICATION

This Patent Applications claims priority to U.S. Provisional Patent Application No. 63/500,084, filed on May 4, 2023, and entitled "LOGICAL-TO-PHYSICAL TABLE COMPRESSION USING AN EXCEPTION LIST AND A LOGICAL TREE." The disclosure of the prior Applications is considered part of and is incorporated by reference into this Patent Applications.

TECHNICAL FIELD

The present disclosure generally relates to memory devices, memory device operations, and, for example, to logical-to-physical (L2P) table compression using an exception list and a logical tree.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

DETAILED DESCRIPTION

Figure 1:
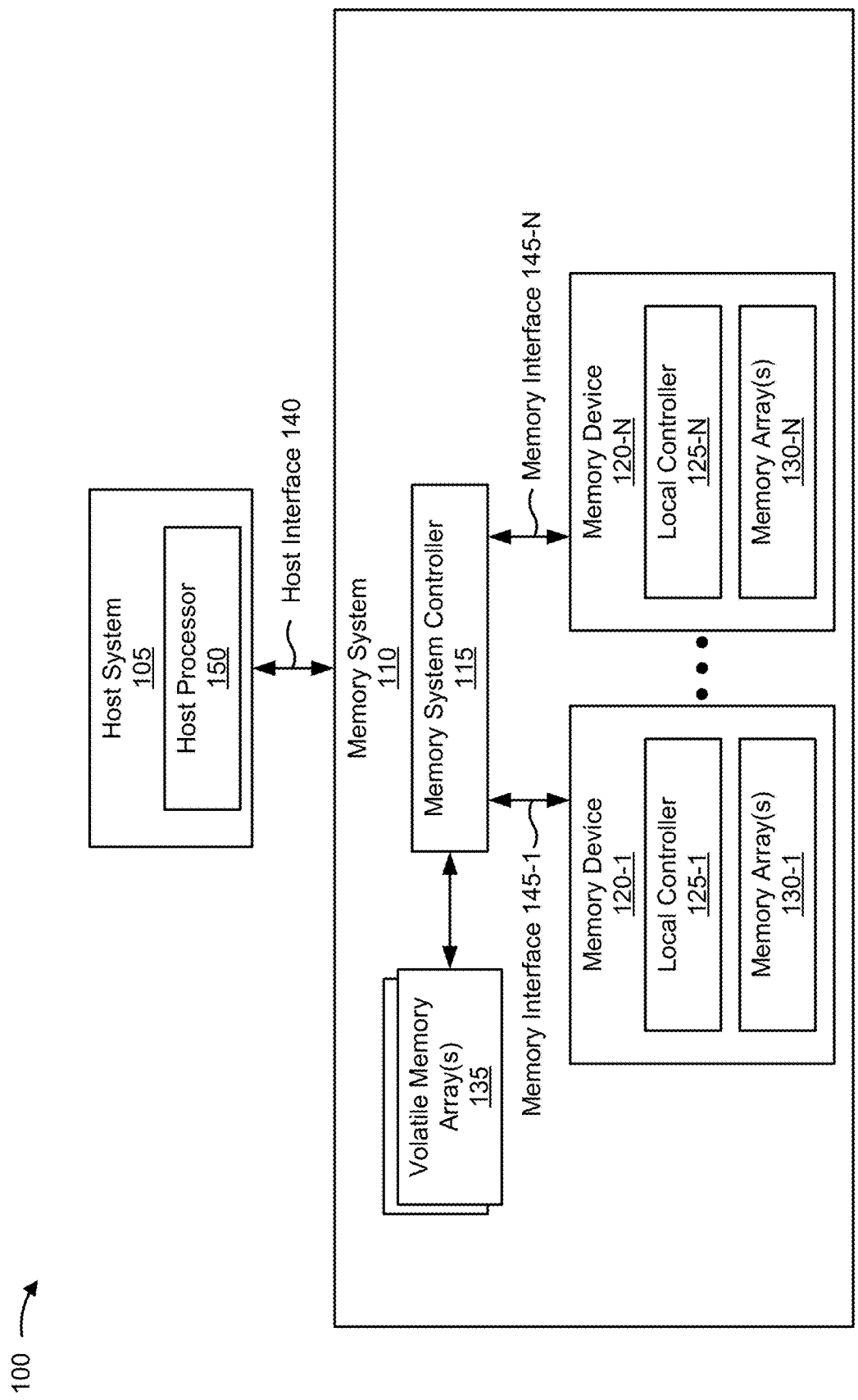
FIG. 1 is a diagram illustrating an example system capable of exception list compression for logical-to-physical (L2P) tables.

As storage capacity of non-volatile memory systems, such as a NAND memory system, increases, those non-volatile memory systems require an increasing amount of volatile memory, such as SRAM or DRAM, to enable fast performance of various memory operations, such as logical-to-physical (L2P) address translation. For example, one or more L2P address tables may be stored in and accessed from volatile memory (e.g., an SRAM array or a DRAM array) to enable faster memory translation than accessing those L2P tables from non-volatile memory, such as NAND memory. Larger capacity memory systems have more physical addresses where data can be stored, and so a larger L2P table is needed to store a larger quantity of logical address (e.g., logical block address (LBA)) to physical address mappings. This requirement for increased volatile memory storage capacity results in a larger memory system physical size (e.g., due to both larger capacity non-volatile memory and corresponding larger capacity volatile memory), consumes additional power to maintain and operate the volatile memory (e.g., for refresh operations), and/or results in increased manufacturing costs, among other examples. Reducing a required size of the volatile memory (e.g., for a given memory system capacity) would reduce a physical footprint of the memory system, would reduce power consumption of the memory system, and would reduce costs to manufacture and operate the memory system.

One technique to reduce volatile memory size is to use L2P table swapping, where only a portion of an L2P table is stored in volatile memory, and the remaining portion of the L2P table is stored in NAND memory. For example, a portion of the L2P table (e.g., an address range) may be cached in volatile memory. The memory system may swap or change the address range cached in the volatile memory over time. However, this technique requires additional memory operations (as compared to storing the entire L2P table in the volatile memory) to write portions of the L2P table from the volatile memory to non-volatile memory and to read portions of the L2P table from non-volatile memory to volatile memory. This increases the latency of L2P address translation and corresponding read and write operations, wears out the memory system more quickly, and causes write amplification issues, particularly in memory systems that operate in a write-intensive environment. Further, the memory system may have a limited amount of volatile memory storage (e.g., to reduce costs and/or a size of the memory system).

Additionally, because only a portion of the L2P table is stored in the volatile memory, an available address range for L2P address translations may be limited. For example, the memory system may only perform fast L2P address translations for LBAs included in an address range that is currently stored in the volatile memory. For other LBAs, the memory system may access the L2P table from non-volatile memory, which increases the latency associated with performing the L2P address translation. As a result, to maintain a smaller volatile memory size, a size of the address range cached in the volatile memory may be smaller, resulting in a lower likelihood that an LBA indicated in a command from a host system is cached in the volatile memory (e.g., and thereby increasing a latency associated with performing L2P address translation). To increase a likelihood that an LBA indicated in a command from a host system is cached in the volatile memory, a size of the address range may be increased, resulting in a larger volatile memory size.

Some implementations described herein enable L2P table compression using an exception list and a logical tree. For example, information associated with an address range (e.g., a physical page table) of an L2P table may be compressed (e.g., to reduce a size of the information to be stored in volatile memory) using the exception list compression described herein. As a result, a size of the information associated with the address range is reduced. This enables a larger address range of the L2P table to be stored in volatile memory of the memory system. Storing a larger address range of the L2P table in the volatile memory increases a likelihood that an LBA indicated in a command is included in the address range (e.g., increases an L2P cache hit rate). This reduces a likelihood that the memory system will need to access the L2P table stored in non-volatile memory, thereby increasing a likelihood that a lower latency L2P address translation can be performed (e.g., using the compressed information stored in the volatile memory).

In some implementations, the exception list compression may include an exception list that indicates one or more physical addresses for one or more LBAs that are associated with a non-sequential physical address. For example, in an initial write operation, LBAs may be written to physical addresses following a sequential order of the LBAs and the physical addresses (e.g., physical addresses in non-volatile memory). However, over time, data associated with some LBAs may be re-written to different (e.g., random) physical addresses. This may result in some physical addresses not having a sequential physical address with respect to other LBAs in a logical order of the LBAs. For example, an LBA 1 may be associated with a physical address 1, an LBA 2 may be associated with a physical address 2, and an LBA 3 may be associated with a physical address 3 (e.g., where LBA 1, LBA 2, and LBA 3 are sequential LBAs in a logical order of the LBAs and the physical address 1, the physical address 2, and the physical address 3 are sequential physical addresses in the non-volatile memory). Data associated with the LBA 2 may be re-written and/or overwritten to a physical address 4. As a result, the physical address mapped to the LBA 2 may no longer be sequential with respect to the physical addresses mapped to the LBA 1 and the LBA 2. The non-sequential physical addresses may increase a compression complexity associated with an address range of the L2P table. To mitigate the compression complexity, one or more exception lists may be maintained that indicate the physical addresses of LBAs that are associated with non-sequential physical addresses.

Physical addresses of other LBAs (e.g., that are associated with sequential physical addresses) may be indicated based on a physical address of another LBA and a logical ordering of the LBAs. For example, if the LBA 1 is associated with a physical address 1, then the LBA 3 may be associated with a physical address 3 if the LBA 3 is associated with a sequential physical address. The physical address 3 can be indicated by indicating the physical address 1 and indicating that the LBA 3 is associated with a sequential physical address, thereby reducing a size of the information needed to indicate the physical address 3. Other L2P address mappings associated with sequential physical addresses may be indicated in a similar manner. If the information in the volatile memory indicates that an LBA is associated with a non-sequential physical address, then the memory system may determine the physical address of the LBA via an entry in the exception list.

In some implementations, the compressed version of the L2P table (or of an address range of the L2P table) may include indications (e.g., a bitmap) indicating whether LBAs included in the L2P table (or the address range) are associated with sequential physical addresses. For example, the compressed version of the L2P table (or of an address range of the L2P table) may include a sequentiality bitmap that includes bits for respective LBAs included in the L2P table (or the address range). A given bit may indicate whether an LBA associated with the given bit is associated with a sequential physical address (e.g., by setting the bit to a first value, such as one (1)) or a non-sequential physical address (e.g., by setting the bit to a second value, such as zero (0)).

In some implementations, the compressed version of the L2P table (or of an address range of the L2P table) may include a data structure associated with indicating non-sequential physical addresses (e.g., for indicating locations of entries and/or information associated with the exception list). For example, if the sequentiality bitmap indicates that an LBA is associated with a non-sequential physical address, then a memory system may use the data structure to lookup or identify the non-sequential physical address. In some implementations, the data structure may include a logical tree, such as a balanced binary tree. For example, each node in the logical tree may include information associated with a set of LBAs to enable the memory system to identify non-sequential physical addresses associated with the set of LBAs. For example, a node may include an indication of LBAs associated with the node, one or more pointers to related nodes in the data structure (e.g., to a parent node and child node(s)), and a pointer to a payload (e.g., to an exception list associated with the node). For example, the payload may be a variable-length array of addresses (e.g., an exception list indicating non-sequential physical addresses of LBAs associated with a given node). The data structure may enable the memory system to efficiently identify non-sequential physical addresses, thereby reducing a processing time associated with identifying the non-sequential physical addresses.

FIG. 1 is a diagram illustrating an example system 100 capable of exception list compression for logical-to-physical tables. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to: compress an address range associated with an L2P table to obtain a compressed version of the address range, wherein the address range is associated with a set of LBAs, wherein the compressed version includes an exception list indicating physical addresses for one or more LBAs, from the set of LBAs, that are associated with non-sequential physical addresses, and wherein the compressed version includes a data structure associated with indicating which LBAs, from the set of LBAs, are associated with non-sequential physical addresses; receive, from a host system, a command indicating an LBA that is included in the set of LBAs; and perform a lookup operation using the compressed version of the address range to identify a physical address associated with the LBA.

In some implementations, one or more systems, devices, apparatuses, components, and/or controllers of FIG. 1 may be configured to: receive a command indicating an LBA that is associated with an L2P table; perform a lookup operation associated with a compressed version of an address range of the L2P table to identify a physical address in non-volatile memory associated with the LBA, wherein the compressed version is stored in a volatile memory of the memory apparatus, wherein the compressed version is associated with an exception list that indicates physical addresses for respective LBAs, included in the address range, that are associated with non-sequential physical addresses, and wherein the compressed version is associated with a binary tree that indicates locations in the exception list associated with the respective LBAs; and perform, based on the command, an action associated with the physical address.

In some implementations, one or more systems, devices, apparatuses, components, and/or controllers of FIG. 1 may be configured to: compress an address range associated with an L2P table to obtain a compressed version of the address range, wherein the address range is associated with a set of LBAs, wherein the compressed version includes a first data structure associated with information for one or more exception lists indicating physical addresses for one or more LBAs, from the set of LBAs, that are associated with non-sequential physical addresses, and wherein the compressed version includes a second data structure associated with indicating which LBAs, from the set of LBAs, are associated with sequential physical addresses; receive, from a host system, a command indicating an LBA that is included in the set of LBAs; and perform a lookup operation using the compressed version of the of the address range to identify a physical address associated with the LBA.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
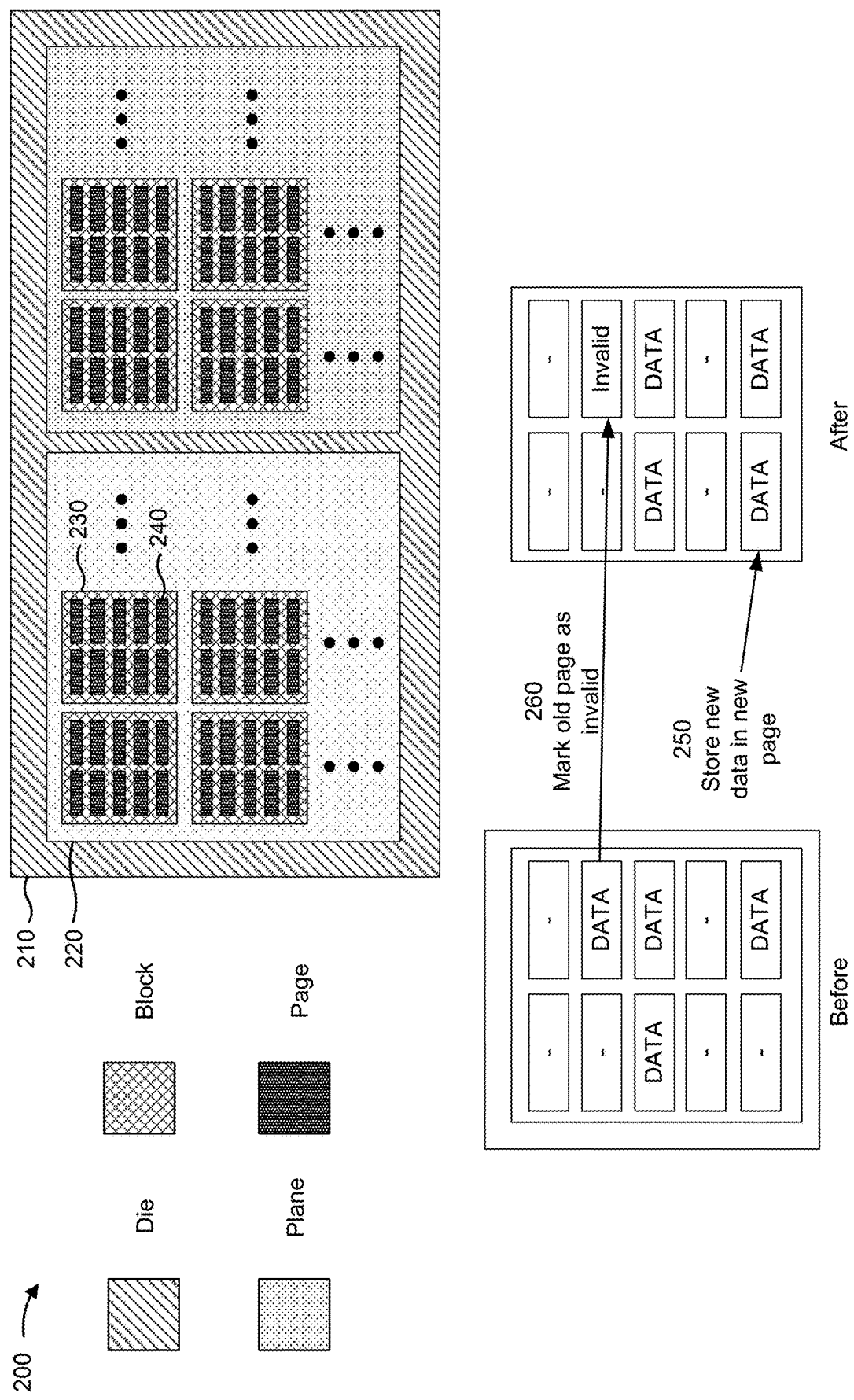
FIG. 2 is a diagram illustrating an example memory architecture that may be used by the memory system and/or a memory device.

FIG. 2 is a diagram illustrating an example memory architecture 200 that may be used by the memory system 110 and/or a memory device 120. For example, the memory device 120 may use the memory architecture 200 to store data. For example, a memory array 130 may include the memory architecture 200. FIG. 2 depicts an example representation (e.g., physical representation) of a memory device 120. As shown, the memory architecture 200 may include a die 210, which may include multiple planes 220. A plane 220 may include multiple blocks 230. The die 210 may be, or may be similar to, a memory device 120. For example, the memory device 120 may include a memory array 135 (and/or volatile memory array 135). The memory array 135 (and/or volatile memory array 135) may include one or more planes 220, one or more blocks 230, and/or one or more pages 240, among other examples. A block 230 may include multiple pages 240. Although FIG. 2 shows a particular quantity of planes 220 per die 210, a particular quantity of blocks 230 per plane 220, and a particular quantity of pages 240 per block 230, these quantities may be different than what is shown. In some implementations, the memory architecture 200 is a NAND memory architecture.

The die 210 is a structure made of semiconductor material, such as silicon. In some implementations, a die 210 is the smallest unit of memory that can independently execute commands. A memory device 120 may include one or more dies 210. In some implementations, the memory device 120 may include multiple dies 210. In this case, multiples dies 210 may each perform a respective memory operation (e.g., a read operation, a write operation, or an erase operation) in parallel. For example, a controller of the memory system 110 (e.g., the memory system controller 115 or one or more local controllers 125) may be configured to concurrently perform memory operations on multiple dies 210 for parallel control.

Each die 210 of a memory device 120 includes one or more planes 220. A plane 220 is sometimes called a memory plane. In some implementations, identical and concurrent operations can be performed on multiple planes 220 (sometimes with restrictions). For example, a multi-plane command (e.g., a multi-plane read command or a multi-plane write command) may be executed on multiple planes 220 concurrently, whereas a single plane command (e.g., a single plane read command or a single plane write command) may be executed on a single plane 220. A logical unit of the memory device 120 may include one or more planes 220 of a die 210. In some implementations, a logical unit may include all planes 220 of a die 210 and may be equivalent to a die 210. Alternatively, a logical unit may include fewer than all planes 220 of a die 210. A logical unit may be identified by a logical unit number (LUN). Depending on the context, the term "LUN" may refer to a logical unit or an identifier (e.g., a number) of that logical unit.

Each plane 220 includes multiple blocks 230. A block 230 is sometimes called a memory block. Each block 230 includes multiple pages 240. A page 240 is sometimes called a memory page. A block 230 is the smallest unit of memory that can be erased. In other words, an individual page 240 of a block 230 cannot be erased without erasing every other page 240 of the block 230. A page 240 is the smallest unit of memory to which data can be written (i.e., the smallest unit of memory that can be programmed with data). The terminology "programming" memory and "writing to" memory may be used interchangeably. A page 240 may include multiple memory cells that are accessible via the same access line (sometimes called a word line). In some implementations, a block 230 may be divided into multiple sub-blocks. A sub-block is a portion of a block 230 and may include a subset of pages 240 of the block and/or a subset of memory cells of the block 230.

In some implementations, read and write operations are performed for a specific page 240, while erase operations are performed for a block 230 (e.g., all pages 240 in the block 230). In some implementations, to prevent wearing out of memory, all pages 240 of a block 230 may be programmed before the block 230 is erased to enable a new program operation to be performed to a page 240 of the block 230. After a page 240 is programmed with data (called "old data" below), that data can be erased, but that data cannot be overwritten with new data prior to being erased. The erase operation would erase all pages 240 in the block 230, and erasing the entire block 230 every time that new data is to replace old data would quickly wear out the memory cells of the block 230. Thus, rather than performing an erase operation, the new data may be stored in a new page (e.g., an empty page), as shown by reference number 250, and the old page that stores the old data may be marked as invalid, as shown by reference number 260. For example, an invalid indication for the old data may be stored or mapped in a table, such as an L2P table. The memory device 120 may then point operations associated with the data to the new page (e.g., in an address table) and may track invalid pages to prevent program operations from being performed on invalid pages prior to an erase operation.

When a block 230 satisfies an erasure condition, the memory device 120 may select the block 230 for erasure, copy the valid data of the block 230 (e.g., to a new block 230 or to the same block 230 after erasure), and erase the block 230. For example, the erasure condition may be that all pages 240 of the block 230 or a threshold quantity or percentage of pages 240 of the block 230 are unavailable for further programming (e.g., are either invalid or already store valid data). As another example, the erasure condition may be that a quantity or percentage of free pages 240 of the block 230 (e.g., pages 240 that are available to be written) is less than or equal to a threshold. The process of selecting a block 230 satisfying an erasure condition, copying valid pages 240 of that block 230 to a new block 230 (or the same block 230 after erasure), and erasing the block 230 is sometimes called garbage collection and is used to free up memory space of the memory device 120.

As indicated above, FIG. 2 is provided as an example. Other examples may differ from what is described with regard to FIG. 2.

Figure 3:
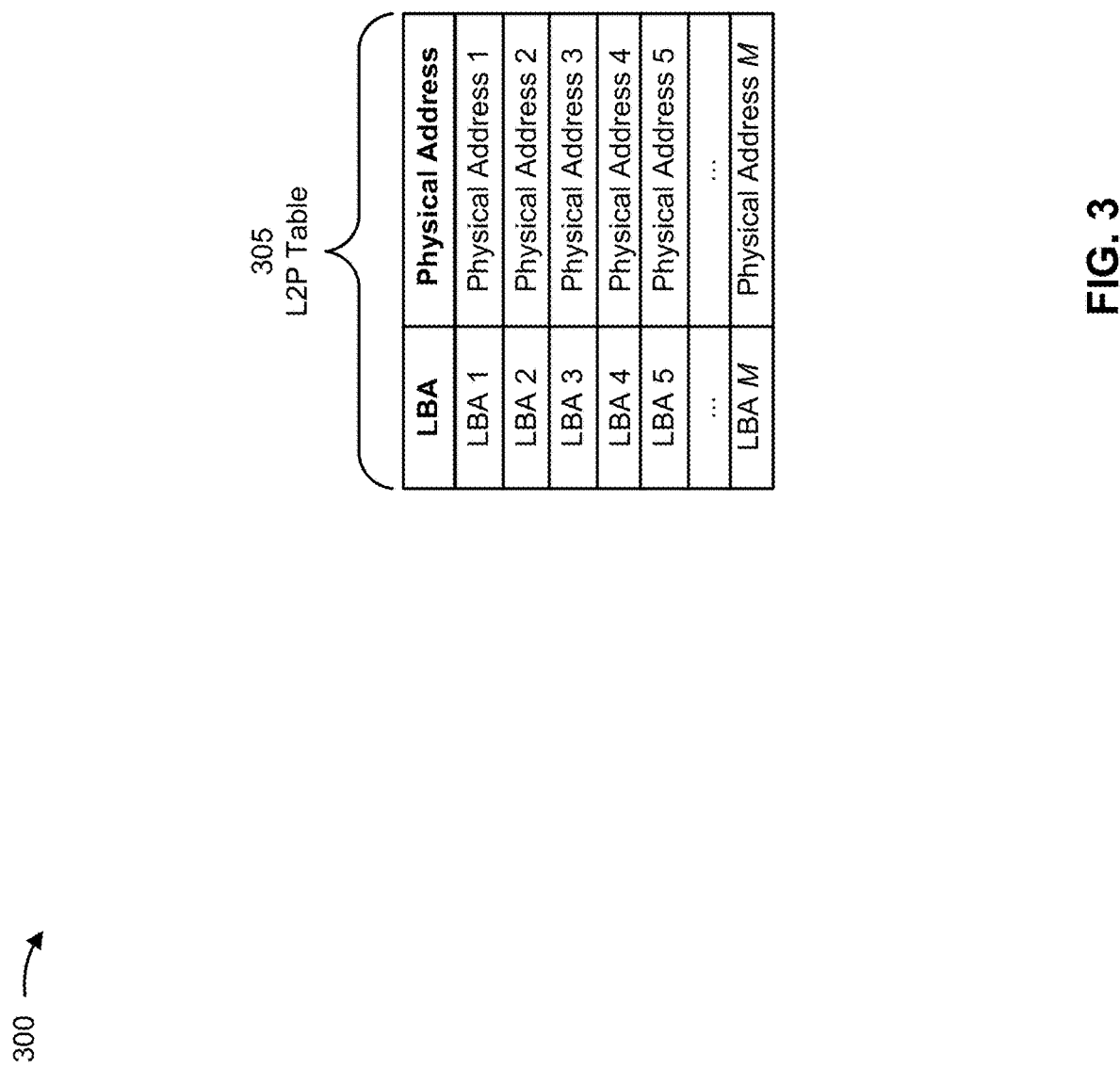
FIG. 3 is a diagram illustrating an example of an L2P table.

FIG. 3 is a diagram illustrating an example 300 of an L2P table 305. For example, FIG. 3 depicts an example of memory address translation. As shown in FIG. 3, the memory system 110 may store one or more address translation tables. An address translation table may be referred to as an L2P mapping table, an L2P address table, or an L2P table, and may be used to translate a logical memory address to a physical memory address.

For example, the memory system 110 may receive a command (e.g., from a host system 105), and the command may indicate a logical memory address, such as an LBA, which is sometimes called a host address. The memory system 110 may use one or more address translation tables to identify a physical memory address (sometimes called a physical address) corresponding to the logical memory address. For example, a read command may indicate an LBA from which data is to be read, or a write command may indicate an LBA to which data is to be written (or to overwrite data previously written to that LBA). The memory system 110 may translate that LBA (or multiple LBAs) to a physical address associated with the memory system 110 (e.g., a physical address in a memory array 130) using an L2P table (or multiple L2P tables). The physical address may indicate a physical location in non-volatile memory, such as a die, a plane, a block, a page, and/or a portion of the page where the data is located.

In some implementations, the memory system 110 may use a logical address called a translation unit (TU), which may correspond to one or more LBAs. For example, an entry in an L2P table may indicate a mapping between a TU (e.g., indicated by a TU index value) and a physical address where data associated with that TU is stored. In some implementations, the physical address may indicate a die, a plane, a block, and a page of the TU. In other examples, the physical address may indicate a die, a plane, a block, and/or a page where data associated with an LBA is written or programmed to.

The memory system 110 may use the L2P table 305 for performing L2P address translations. For example, the L2P table 305 may map logical addresses (e.g., LBAs) to physical addresses in a non-volatile memory of the memory system 110 (e.g., physical addresses in one or more memory arrays 130 of the memory system 110). Although an LBA is described herein as an example of a logical address included in the L2P table 305, other logical addresses or logical units, such as a TU, or a set of LBAs, among other examples, may be used in a similar manner as described herein. In some implementations, the L2P table 305 may be an entire L2P table. In other implementations, the L2P table 305 may be a portion of an L2P table (e.g., a set of entries of the L2P table and/or an address range associated with the L2P table), and/or a physical page table (PPT) associated with an L2P table, among other examples. For example, the L2P table 305 may include a set of LBA and physical address pairs (e.g., a pair may include an LBA and the corresponding physical address, associated with the LBA, in non-volatile memory).

As indicated above, FIG. 3 is provided as an example. Other examples may differ from what is described with regard to FIG. 3.

Figure 4:
FIG. 4 is a diagram of an example of a sequentiality data structure.

FIG. 4 is a diagram of an example 400 of a sequentiality data structure. For example, the sequentiality data structure may be a sequentiality bitmap 420. In other examples, the sequentiality data structure may be another type of data structure that includes or indicates similar information as the sequentiality bitmap 420 described herein.

For example, a memory apparatus (e.g., the memory system 110 and/or one or more components of the memory system 110, such as the memory system controller 115, one or more memory devices 120, and/or one or more local controllers 125) may generate the sequentiality bitmap 420. For example, a bitmap may be a data structure that includes bits for respective LBAs included in the L2P table 305 (e.g., where each bit is associated with a given (e.g., a single) LBA). Although a bitmap is described herein as an example of the indication(s) for the LBAs, other indications may be included in a compressed version of the L2P table 305. For example, the memory apparatus may determine that a given LBA is associated with a sequential physical address. As a result, the memory apparatus may cause an indication that the given LBA is associated with a sequential physical address to be stored in association with the compressed version of the L2P table 305. For example, the compressed version of the L2P table 305 may be associated with a single sequentiality bitmap. In other examples, the compressed version of the L2P table 305 may be associated with multiple sequentiality bitmaps.

The sequentiality bitmap 420 may include a bit for each LBA included in an L2P table, such as the L2P table 305 (e.g., for an entire L2P table or for an address range of an entire L2P table). For example, a compressed version of the L2P table 305 may be associated with a set of indications for respective LBAs included in the L2P table 305. An indication, from the set of indications, may indicate whether an LBA associated with the indication is associated with a sequential physical address. In some implementations, the indications may be included in a bitmap (e.g., the sequentiality bitmap 420). For example, as shown in the sequentiality bitmap 420, if the LBA is associated with a sequential physical address, then the memory apparatus may set a bit associated with the LBA to a first value (e.g., a bit value of "1") in a sequentiality bitmap 420. Alternatively, if the LBA is associated with a non-sequential physical address, then the memory apparatus may set a bit associated with the LBA to a second value (e.g., a bit value of "0") in the sequentiality bitmap 420. For example, as shown in FIG. 4, an LBA 4 and an LBA M may be associated with non-sequential physical addresses.

As indicated above, FIG. 4 is provided as an example. Other examples may differ from what is described with regard to FIG. 4.

Figure 5:
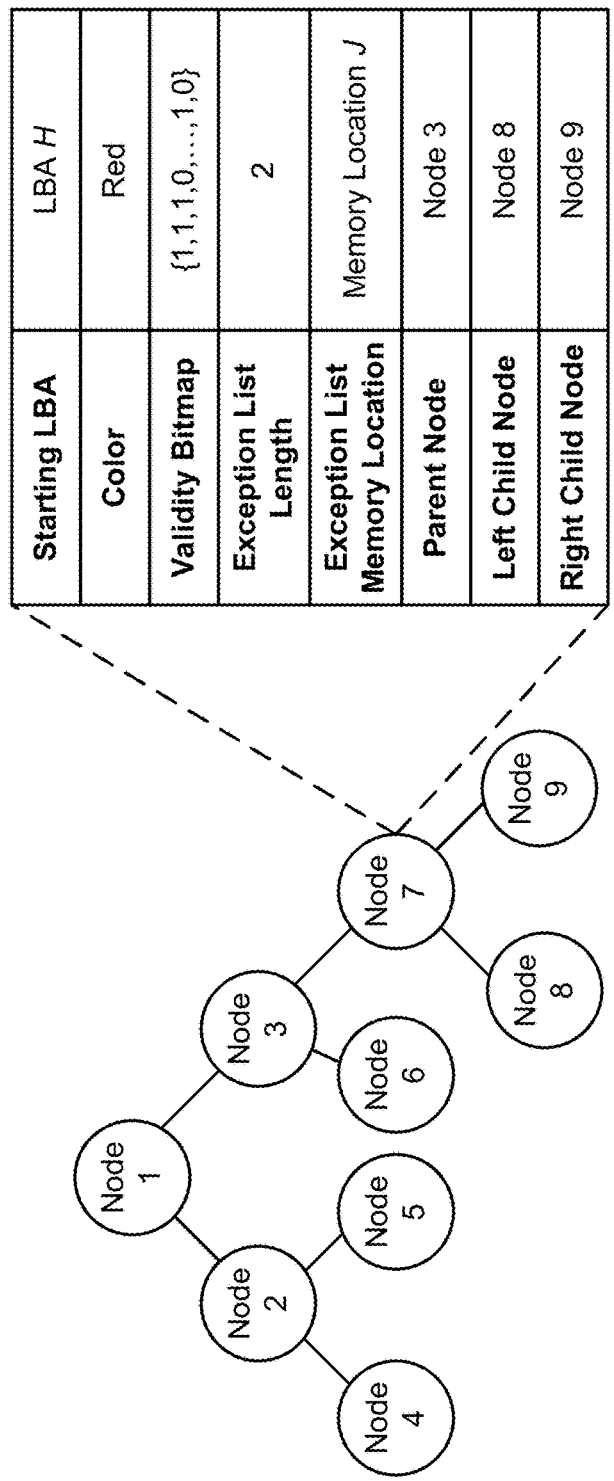
FIG. 5 is a diagram of an example of a data structure of an example exception list.

FIG. 5 is a diagram of an example 500 of a data structure of an example exception list.

For example, a memory apparatus may generate the data structure for the exception list. For example, the data structure may include a set of nodes. The set of nodes may be associated with respective groups of LBAs. For example, a given node may be associated with a given (e.g., single) group of LBAs. For example, each node may represent a fixed run of LBAs included in an address range of an L2P table, such as the L2P table 305. Each node may store data associated with a group of LBAs to facilitate a lookup operation for LBAs included in the group that are associated with non-sequential physical addresses.

For example, a node may include or indicate data. The data may include an indication of a starting LBA associated with each node. For example, as shown in FIG. 5, the starting LBA associated with a node 7 may be an LBA H. For example, if each node is associated with 16 LBAs, then the memory apparatus may associate the node 7 with LBA H through LBA H+15 in the L2P table 305. In some implementations, the data may include an indication of a color associated with each node. For example, the data structure may a field to indicate a color to support, for example, a red-black tree. For example, a red-black tree may be a self-balancing binary search tree. Each node may store one or more bits representing "color" ("red" or "black"), used to ensure that the tree remains balanced during insertions and deletions. For example, the node 7 may be associated with a color of red.

Additionally, or alternatively, the data may include a validity bitmap. The validity bitmap may be similar to the sequentiality bitmap 420 described elsewhere herein. A validity bitmap may include indications (e.g., bits) for respective LBAs associated with a given node. For example, if a node is associated with 16 LBAs, then the validity bitmap may include 16 bits. Each indication (e.g., each bit) may indicate whether an exception list associated with the node includes information associated with a corresponding LBA. For example, if a bit included in the validity bitmap is set to a first value, then the exception list may not include a physical address associated with a corresponding LBA. If the bit included in the validity bitmap is set to a second value, then the exception list may include a physical address (e.g., a non-sequential physical address) associated with the corresponding LBA.

Additionally, or alternatively, the data may include an exception list memory location. For example, exception list(s) associated with the data structure may be stored in a volatile memory location, such as a volatile memory array 135. Each node may include an indication of an address associated with the volatile memory location corresponding to the exception list associated with that node. In some implementations, the exception list memory location may include a single exception list and the exception list memory location for a given node may point to a starting entry included in the exception list that is associated with the given node. As another example, the exception list memory location may include exception lists for respective nodes included in the data structure. In such examples, the exception list memory location may indicate an address, in the volatile memory location, associated with an exception list corresponding to the node. For example, the exception list memory location for the node 7 may be a memory location J. The memory location J may be an address, in volatile memory of the memory apparatus, associated with an exception list associated with the node 7 and/or associated with a first entry (e.g., a starting entry) in an exception list that is associated with LBAs that are associated with the node 7.

In some implementations, the data may include an indication of an exception list length. For example, the exception list length may indicate a quantity of entries included in the exception list associated with a given node. As another example, the exception list length may indicate a quantity of entries included in the exception list (e.g., in total or that are associated with a given node). For example, the node 7 may be associated with two (2) entries in the exception list that are associated with LBAs of the node 7. This information may enable the memory apparatus to quickly parse the exception list to identify a given physical address, thereby reducing processing time associated with performing a lookup operation in the compressed version of the L2P table 305 for a non-sequential physical address.

Each node may include tree mapping information. The tree mapping information may indicate information associated with a mapping of the data structure. For example, each node may include a pointer (e.g., an indication of) a parent node (e.g., a parent node pointer), a pointer (e.g., an indication of) a left child node (e.g., a left child node pointer), and/or pointer (e.g., an indication of) a right child node (e.g., a right child node pointer), among other examples. This information may enable the memory apparatus to parse the data structure to identify a node associated with a given LBA. As an example, the node 7 may be associated with a parent node of node 3, a left child node of node 8, and a right child node of node 9.

As indicated above, FIG. 5 is provided as an example. Other examples may differ from what is described with regard to FIG. 5.

Figure 6A:
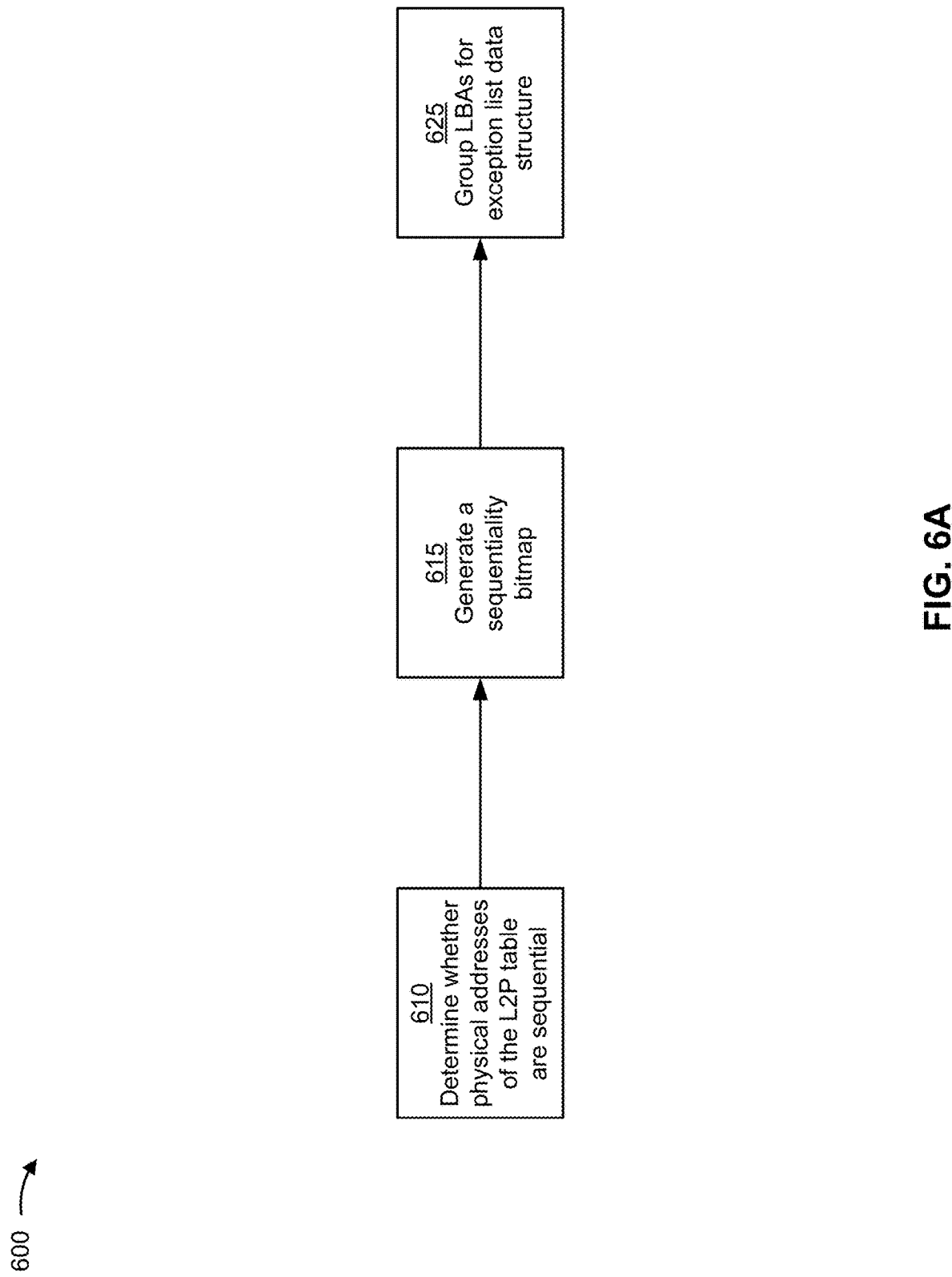
FIGS. 6A and 6B are diagrams of a process associated with L2P table compression using an exception list and a logical tree.
Figure 6B:
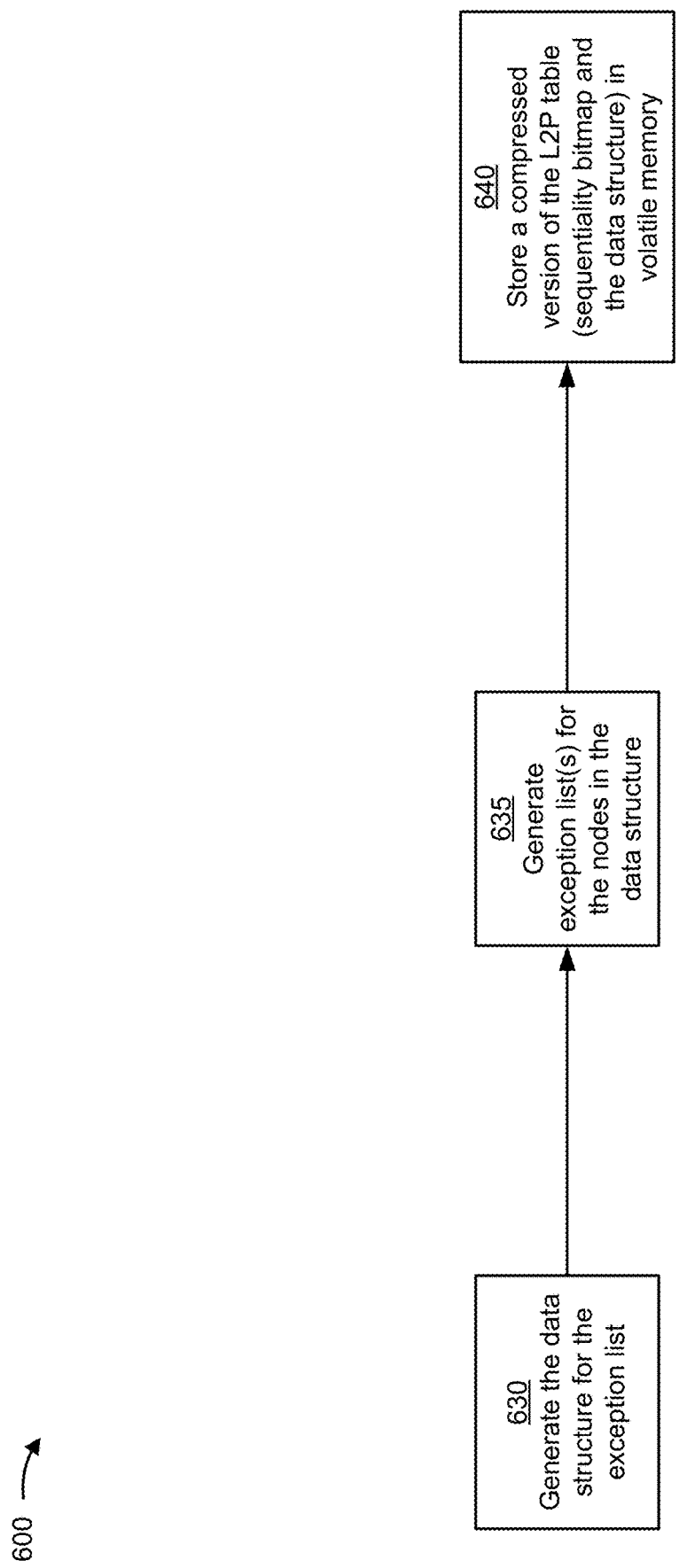

FIGS. 6A and 6B are diagrams of a process 600 associated with L2P table compression using an exception list and a logical tree. The process 600 is associated with compressing an L2P table (or an address range of the L2P table) using an exception list compression technique and a logical tree (e.g., a binary tree). The operations described in connection with FIGS. 6A and 6B may be performed by the memory system 110 and/or one or more components of the memory system 110, such as the memory system controller 115, one or more memory devices 120, and/or one or more local controllers 125.

For example, a memory apparatus (e.g., the memory system 110, the memory system controller 115, one or more memory devices 120, and/or one or more local controllers 125) may store an uncompressed L2P table, such as the L2P table 305 (e.g., in non-volatile memory). In some implementations, the memory apparatus may load or write the uncompressed L2P table from non-volatile memory to volatile memory to generate a compressed version of the L2P table, as described in more detail elsewhere herein. In some implementations, the uncompressed L2P table may loaded and processed by the memory system controller 115 to compress the L2P table, as described in more detail elsewhere herein. Given the limited volatile memory in the memory system 110, the process 600 enables the smaller generated compressed version of the L2P table to be used for memory operations instead of the larger uncompressed L2P table, thereby reducing a size of the L2P table stored in the volatile memory.

As shown by reference number 610, the memory apparatus may determine whether physical addresses of the L2P table are sequential. For example, the memory apparatus may determine whether physical addresses corresponding to sequential LBAs are also sequential. For example, as described elsewhere herein, during an initial programming or writing of data, data associated with different LBAs may be written or programmed to sequential physical addresses (e.g., following a logical order of the physical addresses). For example, data associated with an LBA 1 may be written to a physical address 1, data associated with an LBA 2 may be written to a physical address 2, data associated with an LBA 3 may be written to a physical address 3, and so on. The logical order of the LBAs may not change over time. However, in some cases, data of a given LBA may be re-written to a different physical address. For example, the data associated with the LBA 2 may be written to a physical address 6. An LBA that has data re-written to a different physical address (e.g., that is different from the sequential physical address) may be associated with a non-sequential physical address.

For example, the memory apparatus may determine whether an LBA is associated with a sequential physical address by comparing a location of the LBA in a logical ordering of LBAs included in an L2P table, such as the L2P table 305, to a position of the physical address of the LBA with respect to the physical address of the first LBA that is associated with the L2P table 305. For example, if the LBA is the Lth LBA included in the L2P table 305 (e.g., in accordance with the logical order of the LBAs), then the physical address of the LBA may be a sequential physical address if the physical address is in an Lth position with respect to a physical address of the first LBA of the L2P table 305 (e.g., in accordance with a logical order of the physical addresses). If the physical address is not in the Lth position with respect to the physical address of the first LBA of the L2P table 305, then the physical address of the LBA may be a non-sequential physical address. The logical order of the physical addresses may be defined based on identifiers or index values of respective physical addresses associated with non-volatile memory of the memory apparatus (e.g., of the memory system 110).

The memory apparatus may generate indications for respective LBAs indicating whether the LBAs are associated with sequential or non-sequential physical addresses. For example, as shown by reference number 615, the memory apparatus may generate a sequentiality bitmap. The sequentiality bitmap may be, or may be similar to, the sequentiality bitmap 420. For example, the memory apparatus may determine that a given LBA is associated with a sequential physical address. As a result, the memory apparatus may cause an indication that the given LBA is associated with a sequential physical address to be stored in association with the compressed version of the L2P table 305. For example, the compressed version of the L2P table 305 may be associated with a single sequentiality bitmap. In other examples, the compressed version of the L2P table 305 may be associated with multiple sequentiality bitmaps. For example, as shown in the sequentiality bitmap 420, if the LBA is associated with a sequential physical address, then the memory apparatus may set a bit associated with the LBA to a first value (e.g., a bit value of "1") in a sequentiality bitmap 420.

Alternatively, the memory apparatus may determine that the LBA does not have a sequential physical address. For example, the memory apparatus may determine that the LBA is associated with a non-sequential physical address with respect to the physical address of the first LBA included in the L2P table 305. As a result, the memory apparatus may cause an indication to be stored in association with the compressed version of the L2P table 305 indicating that the LBA is associated with a non-sequential physical address. For example, if the LBA is associated with a non-sequential physical address, then the memory apparatus may set a bit associated with the LBA to a second value (e.g., a bit value of "0") in the sequentiality bitmap 420. For example, as shown in FIG. 6A, an LBA 4 and an LBA M may be associated with non-sequential physical addresses.

In some implementations, the memory apparatus may maintain a record or indication of the non-sequential physical addresses. For example, the memory apparatus may maintain an exception list that indicates the non-sequential physical addresses. The exception list may include an array (e.g., a variable length array) that indicates non-sequential physical addresses identified by the memory apparatus. For example, if an LBA is associated with a non-sequential physical address, then the memory apparatus may cause a physical address associated with the LBA to be stored in the exception list. For example, at a start of a compression operation associated with the L2P table 305, the memory apparatus may initialize the exception list. The memory apparatus may set a tracker of a current position in the exception list to a first position of the exception list. For example, the memory apparatus may maintain an exception list offset value that indicates a position (e.g., an entry) in the exception list relative to the first position (e.g., first entry) of the exception list. The memory apparatus may set the exception list offset value to zero (0) at a start of a compression operation associated with the L2P table 305. The exception list offset value may be used by the memory apparatus to track a current position in the exception list during the compression operation.

For example, the memory apparatus may add the physical address associated with the LBA to an entry (e.g., a current entry) in the exception list. For example, if the exception list offset value is zero, then the memory apparatus may add the physical address associated with the LBA to the first entry in the exception list. After adding the physical address to the exception list, the memory apparatus may increment the exception list offset value. For example, if the exception list offset value is zero, then after adding the physical address to the first entry in the exception list, the memory apparatus may increment the exception list offset value to a value of one (1). In other words, as the memory apparatus populates (e.g., adds entries to) the exception list, the memory apparatus may track positions of entries in the exception list associated with various LBAs.

As described in more detail elsewhere herein, the compressed version of the L2P table 305 may include a data structure to facilitate lookup operations associated with identifying non-sequential physical addresses, such as the data structure depicted in FIG. 5. In some implementations, the data structure may include a logical tree. For example, the data structure may include a binary tree (e.g., a balanced binary tree). In some implementations, the binary tree may be a red-black tree (e.g., where each node included in the tree is associated with a color, red or black). In other examples, the data structure may include a different structure. For example, the data structure may include a structured list, a linear data structure, a non-linear data structure, a search tree, and/or a trie (e.g., a digital tree or a prefix tree), among other examples.

As shown by reference number 625, the memory apparatus may group LBAs included in the L2P table 305 for the exception list data structure. For example, a given group may be associated with a given node in the data structure. In other words, the memory apparatus may associate groups with respective nodes of the data structure. For example, a set of LBAs may be LBAs included in the L2P table 305. In some implementations, the set of LBAs may be associated with an address range of the L2P table 305 (e.g., may be associated with a subset of entries from a set of entries included in the L2P table 305). In some implementations, the set of LBAs may be associated with a PPT. The memory apparatus may group the LBAs into a set of groups.

In some implementations, each group may include the same quantity of LBAs. In other examples, the groups may include different quantities of LBAs. A group may include a set of sequential LBAs (e.g., sequential in a logical order of the LBAs). In other words, a group of LBAs may include a set of logically sequential LBAs. For example, if the set of LBAs includes an LBA 0 through an LBA 1023 (e.g., 1024 LBAs), then a first group may include LBA 0 through LBA 127, a second group may include LBA 128 through LBA 255, a third group may include LBA 256 through LBA 383, and so on (e.g., where each group includes 128 LBAs). As another example, each group may include 16 LBAs, 256 LBAs, or another quantity of LBAs. For example, the memory apparatus may split the set of LBAs into K-LBA groups or chunks, where each group or chunk includes K LBAs.

As shown in FIG. 6B, and by reference number 630, the memory apparatus may generate the data structure for the exception list. For example, the data structure may include a set of nodes, such as the nodes depicted in FIG. 5. The set of nodes may be associated with respective groups of LBAs. For example, a given node may be associated with a given (e.g., single) group of LBAs. For example, each node may represent a fixed run of LBAs included in an address range of the L2P table 305. Each node may store data associated with a group of LBAs to facilitate a lookup operation for LBAs included in the group that are associated with non-sequential physical addresses in a similar manner as described in connection with FIG. 5.

As shown by reference number 635, the memory apparatus may generate one or more exception lists for the nodes included in the data structure. For example, the memory apparatus may generate an exception list for each node included in the data structure. As another example, the memory apparatus may generate a single exception list and may track entries in the exception list that are associated with respective nodes.

For example, for a given node, the memory apparatus may determine whether LBAs associated with the node are associated with non-sequential physical addresses (e.g., in a similar manner as described in more detail elsewhere herein). If an LBA is associated with a non-sequential physical address, then the memory apparatus may add the physical address to the exception list (e.g., that is associated with the given node). Additionally, the memory apparatus may set a bit in the validity bitmap associated with the LBA to indicate that the LBA is associated with an entry in the exception list. If the LBA is associated with a sequential physical address, then the memory apparatus may set a bit in the validity bitmap associated with the LBA to indicate that the LBA is not associated with an entry in the exception list. The memory apparatus may continue to process all LBAs associated with a given node in a similar manner as described above. Additionally, the memory apparatus may process LBAs associated with other nodes in the data structure in a similar manner.

In some implementations, the memory apparatus may compress indications of physical addresses stored for the compressed version of the L2P table 305. For example, as described elsewhere herein, the L2P table 305 may include an address range of a larger L2P table, such as a 2 gigabyte address range, or a 4 gigabyte address range, among other examples. Therefore, the memory apparatus may compress indications of physical addresses by re-mapping the physical addresses according to the address range associated with the L2P table 305. For example, the physical addresses may not need to indicate information for all possible physical addresses. Rather, the memory apparatus may compress the indications of the physical addresses to be based on the address range associated with the L2P table 305 (e.g., rather than to be based on a full address range associated with a larger L2P table). As a result, less information (e.g., less bits) may be used to indicate the physical addresses, reducing a size of the indications of the physical addresses in the compressed version of the L2P table 305. For example, indications of physical addresses in the exception list(s) and/or in the data of a given node may be compressed physical addresses, as described above.

As shown by reference number 640, the memory apparatus may store a compressed version of the L2P table in volatile memory of the memory apparatus (e.g., in a volatile memory array of the memory system 110). For example, the compressed version may include the sequentiality bitmap 420 and/or the data structure, such as the balanced binary tree depicted in FIG. 6B. In some implementations, the compressed version may include both the sequentiality bitmap 420 and the data structure. In other implementations, the compressed version may include only the data structure (e.g., where the sequentiality bitmap 420 is represented by the validity bitmaps included in the data of each node of the data structure).

For example, the compression operation of the L2P table 305 may begin with a set of uncompressed LBA and physical address pairs (e.g., an uncompressed address range of an L2P table). For each node in the data structure, the memory apparatus may store an indication of a memory location of an exception list associated with that node. The memory apparatus may capture and store the address of the first LBA of each node as a physical address (e.g., a base physical address for the group) that is stored for the node. For the remaining LBAs included in the group, if the LBA physical address is sequential to the base physical address at a proper offset (e.g., in accordance with a logical ordering of the LBAs and physical addresses), then the memory apparatus may set a bit, corresponding to the LBA, in the validity bitmap (and/or the sequentiality bitmap 420) associated with the node to the first value (e.g., to a bit value of "1"). Otherwise (e.g., if the LBA physical address is not sequential to the base physical address at the proper offset), then the memory apparatus may set a bit, corresponding to the LBA, in the validity bitmap (and/or the sequentiality bitmap 420) associated with the node to a second value (e.g., to a bit value of "0"). Additionally, the memory apparatus may increment a counter associated with the exception list length for the node to indicate that an additional LBA associated with the node is associated with a non-sequential physical address. Additionally, the memory apparatus may store the physical address associated with the LBA in a current entry of the exception list associated with the node (e.g., as indicated by the current value of the exception list offset value).

The memory apparatus may decompress the compressed version of the address range (e.g., a compressed version of the address range of a physical page table) based on identifying physical addresses of respective LBAs following a logical order of the respective LBAs, based on iterating the physical addresses associated with the respective starting LBAs included in the set of groups or based on information included in an entry included in the exception list. For example, to decompress a compressed version of the address range, the memory apparatus may set the exception list offset value to zero (0). For each node of the data structure, the memory apparatus may identify the base physical address associated with the node and may store the base physical address as being associated with the first LBA of the node in an entry of an L2P table. For each node of the data structure, the memory apparatus may iterate through the validity bitmap (and/or the sequentiality bitmap 420) associated with that node. If a given bit is set to the first value, then the memory apparatus may determine the physical address associated with an LBA corresponding to the given bit by incrementing the base physical address according to a logical ordering of the LBAs (e.g., according to a position of the given bit in the validity bitmap). If a given bit is set to the second value, then the memory apparatus may determine the physical address associated with an LBA corresponding to the given bit from a next entry in the exception list. The memory apparatus may compile entries for the L2P table (e.g., of LBAs and corresponding physical addresses) for all nodes of the data structure and all LBAs in a given node in a similar manner as described above.

In some implementations, the memory apparatus may perform updates directly to the compressed version. For example, the memory apparatus may update a physical address associated with a given LBA by updating a bit associated with the given LBA in a sequentiality bitmap and/or a validity bitmap and adding an entry to or updating the exception list to indicate the new physical address associated with the given LBA (e.g., assuming that the new physical address is a non-sequential physical address). Alternatively, the memory apparatus may perform updates by decompressing the compressed version, updating the L2P table, and re-compressing the L2P table after performing the updates.

As indicated above, FIGS. 6A and 6B are provided as examples. Other examples may differ from what is described with regard to FIGS. 6A and 6B.

Figure 7:
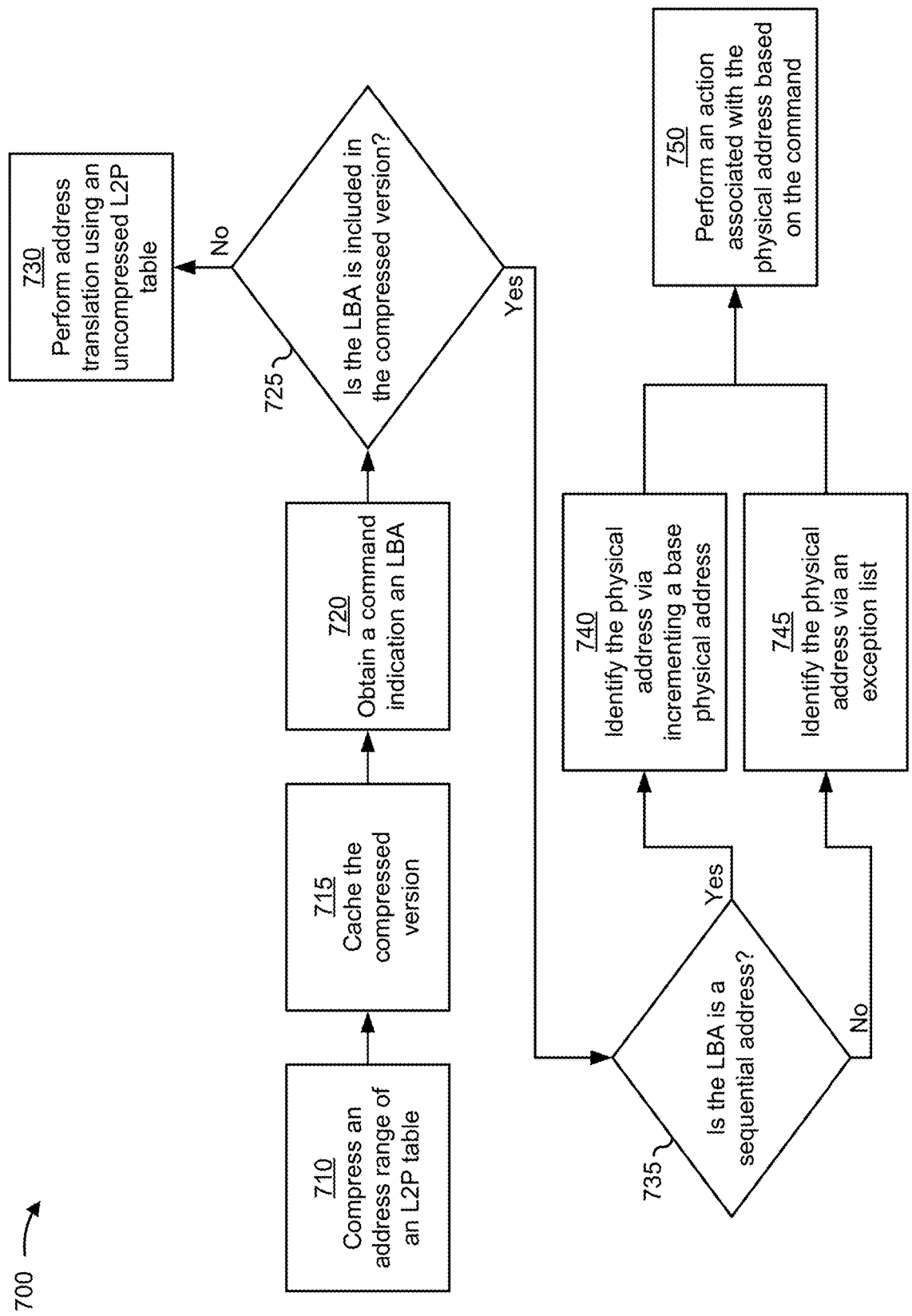
FIG. 7 is a diagram of a process of L2P table compression using an exception list and a logical tree.

FIG. 7 is a diagram of a process 700 of L2P table compression using an exception list and a logical tree. The process 700 is associated with a lookup operation using a compressed version of an L2P table (or a compressed version of an address range of the L2P table), where the compressed version is compressed using an exception list compression technique (e.g., in a similar manner as described in connection with FIGS. 6A and 6B). The operations described in connection with FIG. 7 may be performed by the memory system 110 and/or one or more components of the memory system 110, such as the memory system controller 115, one or more memory devices 120, and/or one or more local controllers 125. For example, some operations are depicted and described in connection with FIG. 7 as being performed by the memory system controller 115. However, in some cases, one or more (or all) operations described herein may be performed by one or more local controllers 125. The memory system 110 may include a volatile memory array (e.g., similar to the one or more volatile memory arrays 135).

As shown by reference number 710, the memory system 110 and/or the memory system controller 115 (e.g., a memory apparatus) may compress an address range of an L2P table. For example, the memory system 110 and/or the memory system controller 115 may compress the address range (e.g., a PPT or a set of entries) using an exception list compression technique, such as by performing one or more operations described above in connection with FIGS. 6A and 6B. For example, the memory apparatus may compress a set of entries associated with an L2P table using the exception list compression technique that includes a data structure as described above in connection with FIGS. 6A and 6B.

As shown by reference number 715, the memory apparatus may cause, based on compressing the set of entries, a compressed version of the set of entries (e.g., a compressed version of the address range) to be cached in the volatile memory array. For example, the memory apparatus may store the compressed version in the volatile memory array.

As shown by reference number 720, the memory apparatus may obtain, from the host system 105, a command indicating an LBA that is associated with the set of entries. For example, the memory apparatus may receive a command indicating an LBA. As shown by reference number 725, the memory apparatus may determine whether the LBA is included in an address range that is associated with the compressed version of the address range stored in the volatile memory array. If the memory apparatus determines that the LBA is included in the compressed version (Yes), then the memory apparatus may proceed with performing a fast address translation using the compressed version. If the memory apparatus determines that the LBA is not included in the compressed version (No), then the memory apparatus may perform address translation for the LBA using an L2P table (e.g., an uncompressed L2P table) stored in another memory array, such as in a non-volatile memory array (as shown by reference number 730).

For example, the memory apparatus may perform a lookup operation using the compressed version to identify a physical address associated with the LBA (e.g., based on determining that the LBA is included in a set of LBAs associated with the compressed version). For example, as shown by reference number 735, the memory apparatus may determine whether the LBA is associated with a sequential physical address using a sequentiality bitmap, such as the sequentiality bitmap 420 and/or a validity bitmap of a given node of the data structure. The memory apparatus may identify a bit, associated with the LBA, included in a sequentiality bitmap. For example, the memory apparatus may identify the bit based on a logical order of the LBAs (e.g., if the LBA is a $5^{th}$ LBA in the logical ordering, then the bit may be the $5^{th}$ bit in the bitmap). If the bit is set to a first value (e.g., a bit value of "1"), then the memory apparatus may determine that the physical address of the LBA is a sequential physical address. In such examples (e.g., Yes as shown by reference number 735), as shown by reference number 740, the memory apparatus may determine the physical address associated with the LBA based on incrementing a base physical address or a starting physical address associated with the sequentiality bitmap and/or associated with a node that is associated with the LBA. For example, as described elsewhere herein, the compressed version may include an indication of a physical address associated with a base physical address or a starting physical address. If the physical address is a sequential physical address, then the memory apparatus may determine the physical address by incrementing the base physical address according to a position of the LBA in the logical ordering of the LBAs. For example, if the LBA is in an $S^{th}$ position of the logical ordering of the LBAs, then the memory apparatus may determine that the physical address is the base physical address incremented by S−1.

If the bit is set to a second value (e.g., a bit value of "0"), then the memory apparatus may determine that the physical address of the LBA is a non-sequential physical address. In such examples (e.g., No as shown by reference number 735), as shown by reference number 745, the memory apparatus may determine the physical address associated with the LBA based on an entry in the exception list included in the compressed version. For example, the memory apparatus may identify a node associated with the LBA in the data structure. The memory apparatus may identify a memory address location of an exception list associated with the node based on data indicated by the node. For example, the memory apparatus may determine the entry associated with the LBA based on an exception list length associated with the exception list, and/or a position of the LBA in the logical ordering of the LBAs associated with the node. For example, the memory apparatus may determine the entry associated with the LBA in a similar manner as described in more detail elsewhere herein, such as in connection with FIGS. 6A and 6B. The entry in the exception list may indicate the physical address associated with the LBA.

As a result, a size of the information associated with the address range stored in the volatile memory array is reduced. This enables a larger address range of the L2P table to be stored in the volatile memory array. Storing a larger address range of the L2P table in the volatile memory array increases a likelihood that an LBA indicated by the command is included in the address range (e.g., increases an L2P cache hit rate). This reduces a likelihood that the memory system will need to access the L2P table stored in non-volatile memory, thereby increasing a likelihood that a lower latency L2P address translation can be performed (e.g., using the compressed information stored in the volatile memory array). This improves the performance of the memory system 110.

As shown by reference number 750, the memory apparatus may perform an action associated with the physical address based on the command. For example, the command may indicate the operation to be performed. As an example, the memory apparatus may read data from the physical address and may provide the data to the host system 105. As another example, the memory apparatus may erase the data from the physical address. As another example, the memory apparatus may read the data from the physical address and may write the data to a different physical address.

As indicated above, FIG. 7 is provided as an example. Other examples may differ from what is described with regard to FIG. 7.

Figure 8:
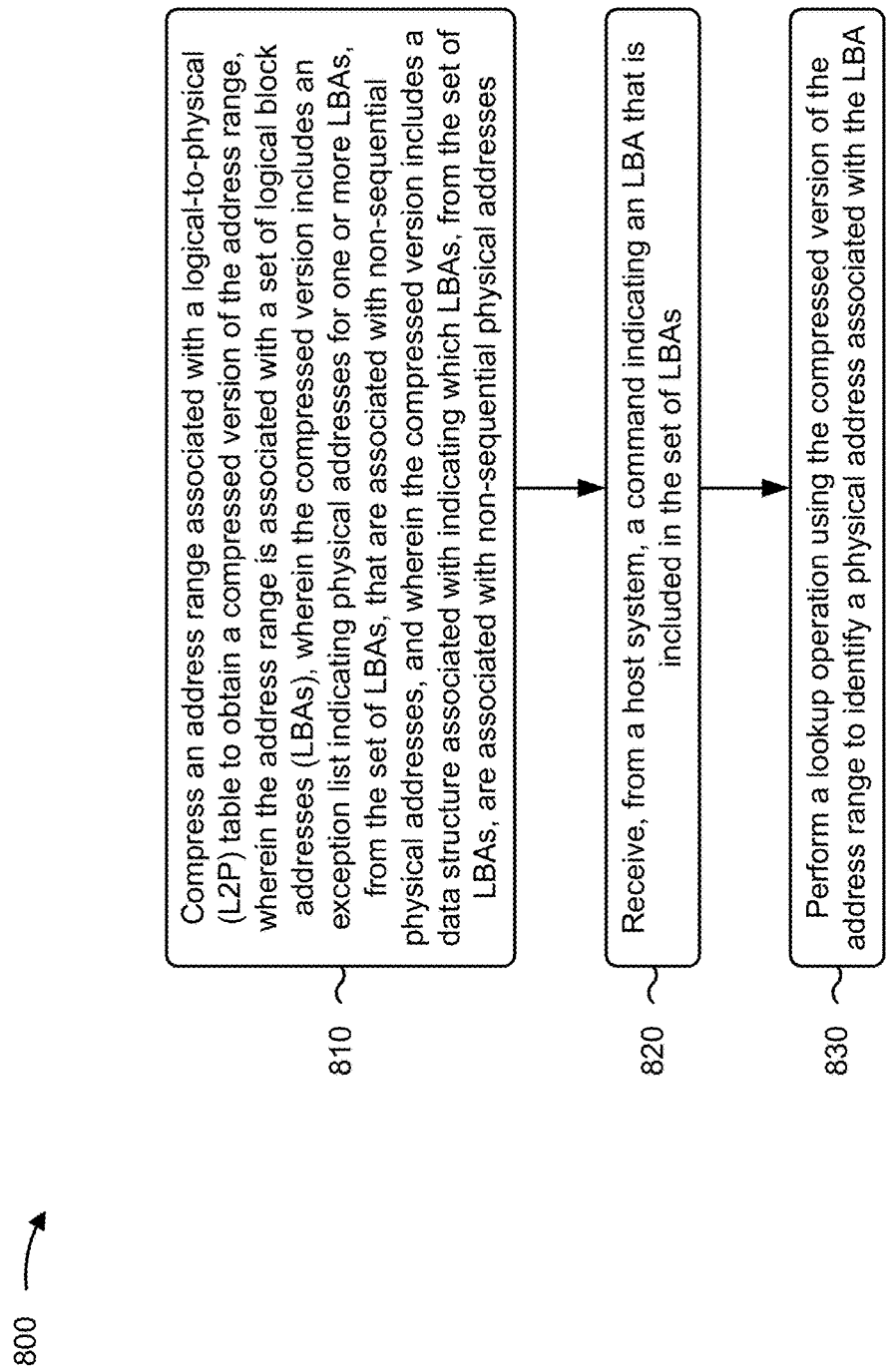
FIG. 8 is a flowchart of an example method associated with L2P table compression using an exception list and a logical tree.

FIG. 8 is a flowchart of an example method 800 associated with L2P table compression using an exception list and a logical tree. In some implementations, a memory apparatus (e.g., the memory system 110 and/or the memory system controller 115) may perform or may be configured to perform the method 800. In some implementations, another device or a group of devices separate from or including the memory apparatus (e.g., the host system 105 and/or the host processor 150) may perform or may be configured to perform the method 800. Additionally, or alternatively, one or more components of the memory apparatus (e.g., one or more memory devices 120 and/or one or more local controllers 125) may perform or may be configured to perform the method 800. Thus, means for performing the method 800 may include the memory apparatus and/or one or more components of the memory apparatus. Additionally, or alternatively, a non-transitory computer-readable medium may store one or more instructions that, when executed by the memory apparatus, cause the memory apparatus to perform the method 800.

As shown in FIG. 8, the method 800 may include compressing an address range associated with an L2P table to obtain a compressed version of the address range, wherein the address range is associated with a set of LBAs, wherein the compressed version includes an exception list indicating physical addresses for one or more LBAs, from the set of LBAs, that are associated with non-sequential physical addresses, and wherein the compressed version includes a data structure associated with indicating which LBAs, from the set of LBAs, are associated with non-sequential physical addresses (block 810). As further shown in FIG. 8, the method 800 may include receiving, from a host system, a command indicating an LBA that is included in the set of LBAs (block 820). As further shown in FIG. 8, the method 800 may include performing a lookup operation using the compressed version of the address range to identify a physical address associated with the LBA (block 830).

The method 800 may include additional aspects, such as any single aspect or any combination of aspects described below and/or described in connection with one or more other methods or operations described elsewhere herein.

In a first aspect, the data structure includes a balanced binary tree.

In a second aspect, alone or in combination with the first aspect, the data structure includes a set of nodes for respective subsets of LBAs from the set of LBAs, and the nodes include indications of whether the respective subsets of LBAs are associated with sequential physical addresses.

In a third aspect, alone or in combination with one or more of the first and second aspects, the indications of whether the respective subsets of LBAs are associated with sequential physical addresses include a bitmap.

In a fourth aspect, alone or in combination with one or more of the first through third aspects, each node includes a parent node pointer, a left child node pointer, and a right child node pointer.

In a fifth aspect, alone or in combination with one or more of the first through fourth aspects, the exception list includes exception lists for respective nodes from the set of nodes.

In a sixth aspect, alone or in combination with one or more of the first through fifth aspects, each node includes a pointer to at least one exception list from the exception lists.

In a seventh aspect, alone or in combination with one or more of the first through sixth aspects, each node includes an indication of starting LBAs of the respective subsets of LBAs.

In an eighth aspect, alone or in combination with one or more of the first through seventh aspects, the method 800 includes determining whether the physical address associated with the LBA is a sequential physical address based on a sequentiality bitmap, and determining the physical address associated with the LBA based on another physical address of a base LBA if the physical address is a sequential physical address, or an entry in the exception list indicated by information associated with a node, from the set of nodes, associated with the LBA if the physical address is not a sequential physical address.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

Figure 9:
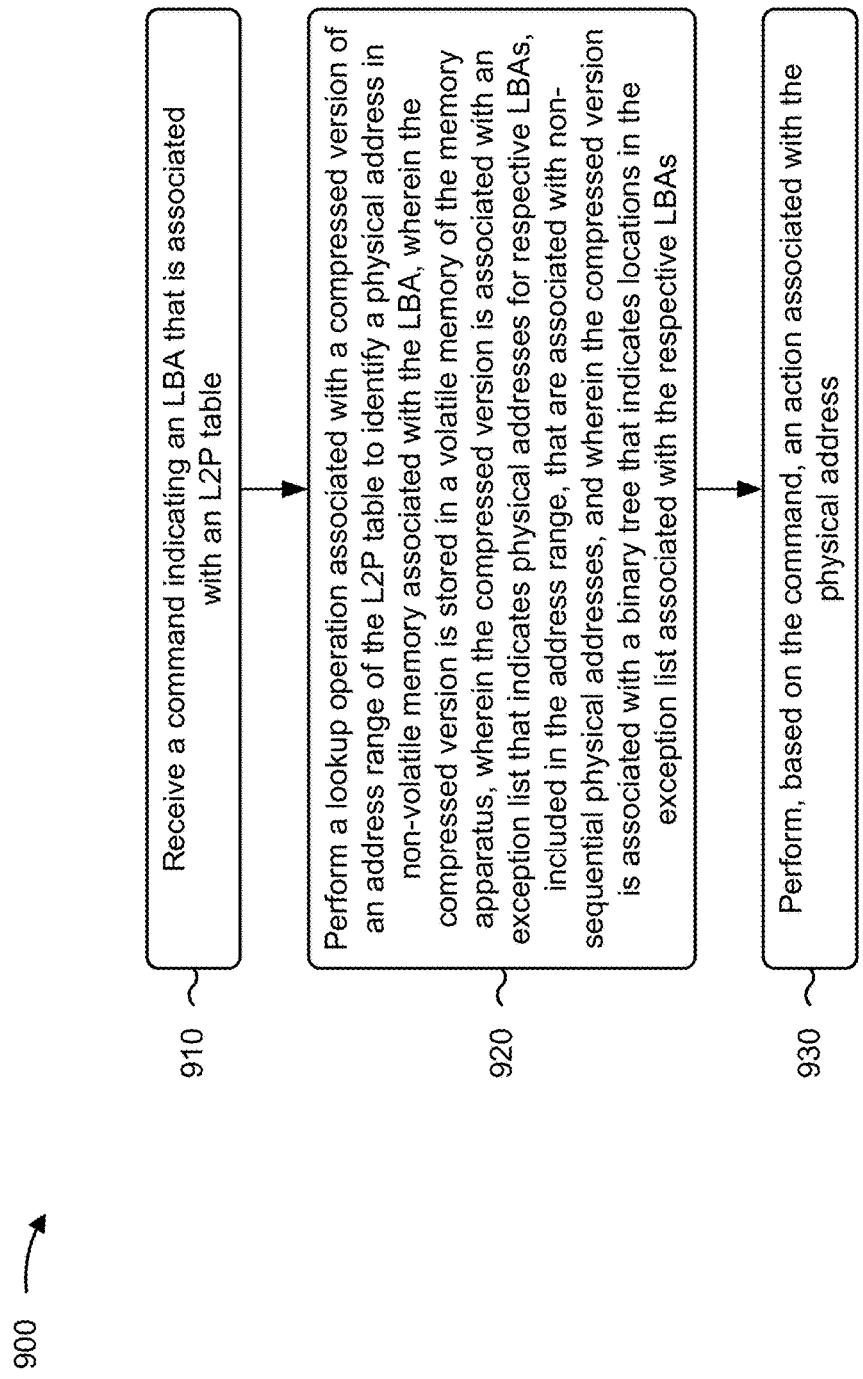
FIG. 9 is a flowchart of an example method associated with L2P table compression using an exception list and a logical tree.

FIG. 9 is a flowchart of an example method 900 associated with L2P table compression using an exception list and a logical tree. In some implementations, a memory apparatus (e.g., the memory system 110 and/or the memory system controller 115) may perform or may be configured to perform the method 900. In some implementations, another device or a group of devices separate from or including the memory apparatus (e.g., the host system 105 and/or the host processor 150) may perform or may be configured to perform the method 900. Additionally, or alternatively, one or more components of the memory apparatus (e.g., one or more memory devices 120 and/or one or more local controllers 125) may perform or may be configured to perform the method 900. Thus, means for performing the method 900 may include the memory apparatus and/or one or more components of the memory apparatus. Additionally, or alternatively, a non-transitory computer-readable medium may store one or more instructions that, when executed by the memory apparatus, cause the memory apparatus to perform the method 900.

As shown in FIG. 9, the method 900 may include receiving a command indicating an LBA that is associated with an L2P table (block 910). As further shown in FIG. 9, the method 900 may include performing a lookup operation associated with a compressed version of an address range of the L2P table to identify a physical address in non-volatile memory associated with the LBA, wherein the compressed version is stored in a volatile memory of the memory apparatus, wherein the compressed version is associated with an exception list that indicates physical addresses for respective LBAs, included in the address range, that are associated with non-sequential physical addresses, and wherein the compressed version is associated with a binary tree that indicates locations in the exception list associated with the respective LBAs (block 920). As further shown in FIG. 9, the method 900 may include performing, based on the command, an action associated with the physical address (block 930).

The method 900 may include additional aspects, such as any single aspect or any combination of aspects described below and/or described in connection with one or more other methods or operations described elsewhere herein.

In a first aspect, the compressed version includes a sequentiality bitmap that includes indications for the respective LBAs that indicate whether the respective LBAs are associated with non-sequential physical addresses.

In a second aspect, alone or in combination with the first aspect, performing the lookup operation comprises determining, based on the sequentiality bitmap, whether the LBA is associated with a sequential physical address, and determining the physical address based on a first physical address associated with the sequentiality bitmap and a position in the sequentiality bitmap associated with the LBA if the LBA is associated with the sequential physical address, or an entry in the exception list associated with the LBA if the LBA is not associated with the sequential physical address.

In a third aspect, alone or in combination with one or more of the first and second aspects, the binary tree includes a set of nodes for respective subsets of LBAs from a set of LBAs included in the address range, and the exception list includes exception lists for respective nodes from the set of nodes.

In a fourth aspect, alone or in combination with one or more of the first through third aspects, a node, from the set of nodes, includes an indication of at least one of a starting LBA associated with the node, a color associated with the node, a parent node pointer, a left child node pointer, a right child node pointer, and/or a pointer to the exception list.

In a fifth aspect, alone or in combination with one or more of the first through fourth aspects, the exception list is a variable length array indicating the physical addresses for respective LBAs, associated with a node included in the binary tree, that are associated with non-sequential physical addresses.

In a sixth aspect, alone or in combination with one or more of the first through fifth aspects, the binary tree includes a set of nodes for respective subsets of LBAs from a set of LBAs included in the address range, and each node, from the set of nodes, includes a validity bitmap indicating whether LBAs included in the respective subsets of LBAs are included exception lists associated with respective nodes from the set of nodes.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

Figure 10:
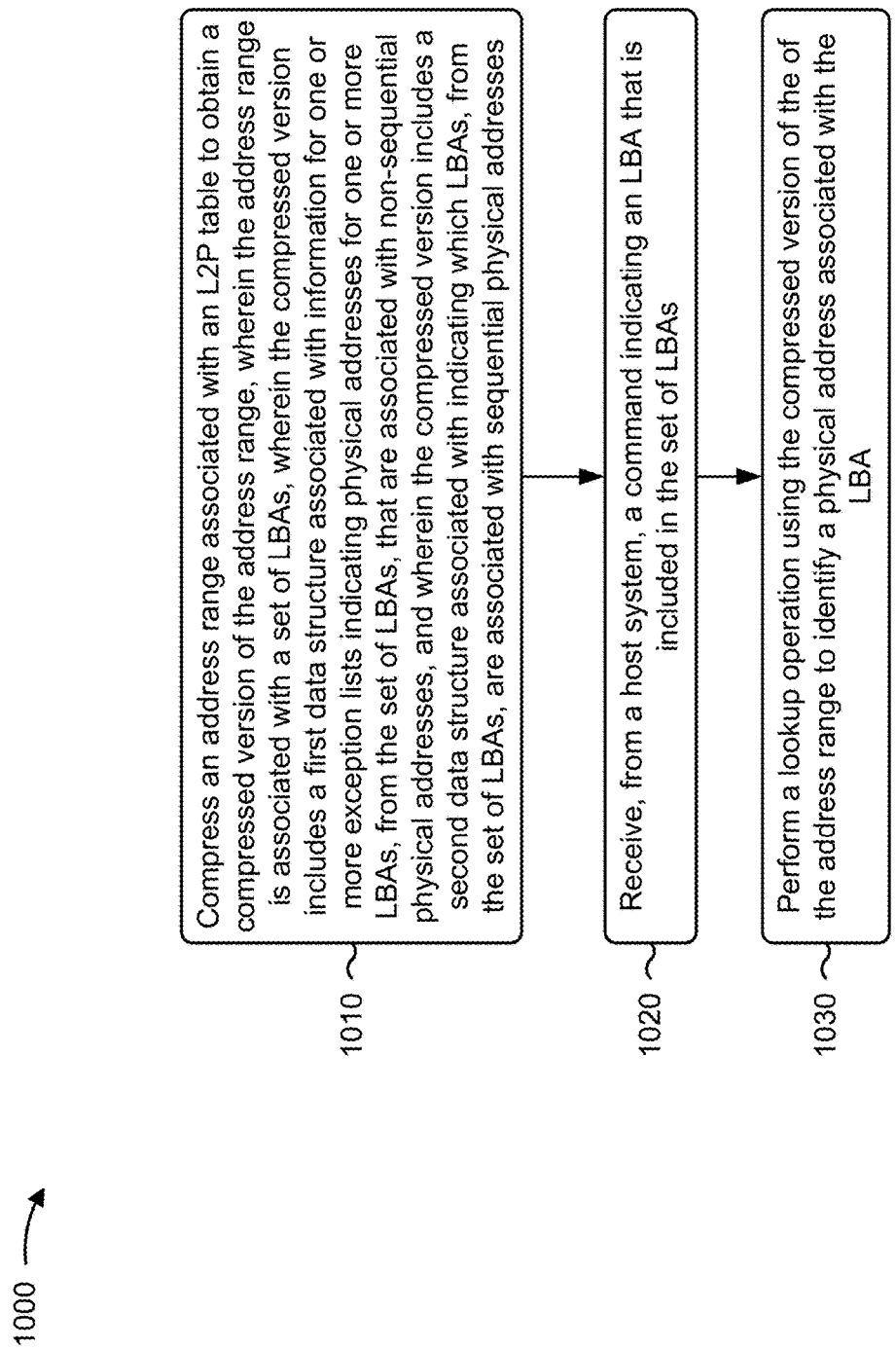
FIG. 10 is a flowchart of an example method associated with L2P table compression using an exception list and a logical tree.

FIG. 10 is a flowchart of an example method 1000 associated with L2P table compression using an exception list and a logical tree. In some implementations, a memory apparatus (e.g., the memory system 110 and/or the memory system controller 115) may perform or may be configured to perform the method 1000. In some implementations, another device or a group of devices separate from or including the memory apparatus (e.g., the host system 105 and/or the host processor 150) may perform or may be configured to perform the method 1000. Additionally, or alternatively, one or more components of the memory apparatus (e.g., one or more memory devices 120 and/or one or more local controllers 125) may perform or may be configured to perform the method 1000. Thus, means for performing the method 1000 may include the memory apparatus and/or one or more components of the memory apparatus. Additionally, or alternatively, a non-transitory computer-readable medium may store one or more instructions that, when executed by the memory apparatus, cause the memory apparatus to perform the method 1000.

As shown in FIG. 10, the method 1000 may include compressing an address range associated with an L2P table to obtain a compressed version of the address range, wherein the address range is associated with a set of LBAs, wherein the compressed version includes a first data structure associated with information for one or more exception lists indicating physical addresses for one or more LBAs, from the set of LBAs, that are associated with non-sequential physical addresses, and wherein the compressed version includes a second data structure associated with indicating which LBAs, from the set of LBAs, are associated with sequential physical addresses (block 1010). As further shown in FIG. 10, the method 1000 may include receiving, from a host system, a command indicating an LBA that is included in the set of LBAs (block 1020). As further shown in FIG. 10, the method 1000 may include performing a lookup operation using the compressed version of the of the address range to identify a physical address associated with the LBA (block 1030).

The method 1000 may include additional aspects, such as any single aspect or any combination of aspects described below and/or described in connection with one or more other methods or operations described elsewhere herein.

In a first aspect, the first data structure includes a red-black balanced binary tree.

In a second aspect, alone or in combination with the first aspect, the first data structure includes a set of nodes for respective subsets of LBAs from the set of LBAs, and the nodes include validity bitmaps indicating whether the respective subsets of LBAs are associated with sequential physical addresses.

In a third aspect, alone or in combination with one or more of the first and second aspects, the physical address indicates an address in the non-volatile memory, the apparatus includes a volatile memory, and the compressed version of the address range is stored in the volatile memory.

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein.

In some implementations, a memory apparatus includes one or more controllers configured to: compress an address range associated with a logical-to-physical (L2P) table to obtain a compressed version of the address range, wherein the address range is associated with a set of logical block addresses (LBAs), wherein the compressed version includes an exception list indicating physical addresses for one or more LBAs, from the set of LBAs, that are associated with non-sequential physical addresses, and wherein the compressed version includes a data structure associated with indicating which LBAs, from the set of LBAs, are associated with non-sequential physical addresses; receive, from a host system, a command indicating an LBA that is included in the set of LBAs; and perform a lookup operation using the compressed version of the address range to identify a physical address associated with the LBA.

In some implementations, a method includes receiving, by a memory apparatus, a command indicating a logical block address (LBA) that is associated with a logical-to-physical (L2P) table; performing, by the memory apparatus, a lookup operation associated with a compressed version of an address range of the L2P table to identify a physical address in non-volatile memory associated with the LBA, wherein the compressed version is stored in a volatile memory of the memory apparatus, wherein the compressed version is associated with an exception list that indicates physical addresses for respective LBAs, included in the address range, that are associated with non-sequential physical addresses, and wherein the compressed version is associated with a binary tree that indicates locations in the exception list associated with the respective LBAs; and performing, by the memory apparatus and based on the command, an action associated with the physical address.

In some implementations, an apparatus includes non-volatile memory; and a controller configured to execute instructions that cause the apparatus to: compress an address range associated with a logical-to-physical (L2P) table to obtain a compressed version of the address range, wherein the address range is associated with a set of logical block addresses (LBAs), wherein the compressed version includes a first data structure associated with information for one or more exception lists indicating physical addresses for one or more LBAs, from the set of LBAs, that are associated with non-sequential physical addresses, and wherein the compressed version includes a second data structure associated with indicating which LBAs, from the set of LBAs, are associated with sequential physical addresses; receive, from a host system, a command indicating an LBA that is included in the set of LBAs; and perform a lookup operation using the compressed version of the of the address range to identify a physical address associated with the LBA.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory apparatus, comprising:
   one or more controllers configured to:
      compress an address range associated with a logical-to-physical (L2P) table to obtain a compressed version of the address range,
         wherein the address range is associated with a set of logical block addresses (LBAs),
         wherein the compressed version includes an exception list indicating physical addresses for one or more LBAs, from the set of LBAs, that are associated with non-sequential physical addresses, and
         wherein the compressed version includes a data structure associated with indicating which LBAs, from the set of LBAs, are associated with non-sequential physical addresses, wherein the data structure includes a set of nodes, wherein a node of the set of nodes is associated with a fixed run of LBAs, from the set of LBAs, and wherein the node includes an indication of a starting LBA of the fixed run of LBAs and a sequentiality bitmap that includes one or more indications corresponding to the fixed run of LBAs, wherein an indication of the sequentiality bitmap indicates whether a physical address associated with an LBA of the fixed run of LBAs is a sequential physical address with respect to a physical address associated with the starting LBA;
      receive, from a host system, a command indicating another LBA that is included in the set of LBAs; and
      perform a lookup operation using the compressed version of the address range to identify a physical address associated with the other LBA.

2. The memory apparatus of claim 1, wherein the data structure includes a balanced binary tree.

3. The memory apparatus of claim 1, wherein each node includes a parent node pointer, a left child node pointer, and a right child node pointer.

4. The memory apparatus of claim 1, wherein the exception list includes exception lists for respective nodes from the set of nodes.

5. The memory apparatus of claim 4, wherein each node includes a pointer to at least one exception list from the exception lists.

6. The memory apparatus of claim 1, wherein the one or more controllers, to perform the lookup operation, are configured to:
   determine whether the physical address associated with the other LBA is a sequential physical address based on the sequentiality bitmap; and
   determine the physical address associated with the other LBA based on:
      another physical address of a base LBA if the physical address is a sequential physical address, or
      an entry in the exception list indicated by information associated with a node, from the set of nodes, associated with the other LBA if the physical address is not a sequential physical address.

7. An apparatus, comprising:
   non-volatile memory; and
   a controller configured to execute instructions that cause the apparatus to:
      compress an address range associated with a logical-to-physical (L2P) table to obtain a compressed version of the address range,
         wherein the address range is associated with a set of logical block addresses (LBAs),
         wherein the compressed version includes a first data structure associated with information for one or more exception lists indicating physical addresses for one or more LBAs, from the set of LBAs, that are associated with non-sequential physical addresses, and
         wherein the compressed version includes a second data structure associated with indicating which LBAs, from the set of LBAs, are associated with sequential physical addresses, wherein the first data structure includes a set of nodes, wherein a node of the set of nodes is associated with a fixed run of LBAs, from the set of LBAs, and wherein the node includes an indication of a starting LBA of the fixed run of LBAs and a sequentiality bitmap associated with the second data structure that includes one or more indications corresponding to the fixed run of LBAs, wherein an indication of the sequentiality bitmap indicates whether a physical address associated with an LBA of the fixed run of LBAs is a sequential physical address with respect to a physical address associated with the starting LBA;

receive, from a host system, a command indicating another LBA that is included in the set of LBAs; and perform a lookup operation using the compressed version of the of the address range to identify a physical address associated with the other LBA.

8. The apparatus of claim 7, wherein the first data structure includes a red-black balanced binary tree.

9. The apparatus of claim 7, wherein the nodes include validity bitmaps indicating whether respective subsets of LBAs are associated with sequential physical addresses.

10. The apparatus of claim 7, wherein the physical address indicates an address in the non-volatile memory,
wherein the apparatus includes a volatile memory, and
wherein the compressed version of the address range is stored in the volatile memory.

11. The apparatus of claim 7, wherein each node includes a parent node pointer, a left child node pointer, and a right child node pointer.

12. The apparatus of claim 7, wherein each node includes a pointer to at least one exception list from the one or more exception lists.

13. The apparatus of claim 7, wherein, to perform the lookup operation, the controller is further configured to execute instructions that further cause the apparatus to:
determine whether the physical address associated with the other LBA is a sequential physical address based on the sequentiality bitmap; and
determine the physical address associated with the other LBA based on:
another physical address of a base LBA if the physical address is a sequential physical address, or
an entry in an exception list of the one or more exception lists indicated by information associated with a node, from the set of nodes, associated with the other LBA if the physical address is not a sequential physical address.

14. A method, comprising:
receiving, by a memory apparatus, a command indicating a logical block address (LBA) that is associated with a logical-to-physical (L2P) table;
performing, by the memory apparatus, a lookup operation associated with a compressed version of an address range of the L2P table to identify a physical address in non-volatile memory associated with the LBA,
wherein the compressed version is stored in a volatile memory of the memory apparatus,
wherein the compressed version is associated with an exception list that indicates physical addresses for respective LBAs, included in the address range, that are associated with non-sequential physical addresses, and
wherein the compressed version is associated with a binary tree that indicates locations in the exception list associated with the respective LBAs, wherein the binary tree includes a set of nodes, wherein a node of the set of nodes is associated with a fixed run of LBAs of the address range and wherein the node includes an indication of a starting LBA of the fixed run of LBAs and a sequentiality bitmap that includes one or more indications corresponding to the fixed run of LBAs, wherein an indication of the sequentiality bitmap indicates whether a physical address associated with another LBA of the fixed run of LBAs is a sequential physical address with respect to a physical address associated with the starting LBA; and performing, by the memory apparatus and based on the command, an action associated with the physical address.

15. The method of claim 14, wherein the compressed version includes the sequentiality bitmap that further includes indications for the respective LBAs that indicate whether the respective LBAs are associated with non-sequential physical addresses.

16. The method of claim 15, wherein performing the lookup operation comprises:
determining, based on the sequentiality bitmap, whether the LBA is associated with a sequential physical address; and
determining the physical address based on:
a first physical address associated with the sequentiality bitmap and a position in the sequentiality bitmap associated with the LBA if the LBA is associated with the sequential physical address, or
an entry in the exception list associated with the LBA if the LBA is not associated with the sequential physical address.

17. The method of claim 14, wherein the exception list includes exception lists for respective nodes from the set of nodes.

18. The method of claim 17, wherein a node, from the set of nodes, includes an indication of at least one of:
a color associated with the node,
a parent node pointer,
a left child node pointer,
a right child node pointer, and
a pointer to the exception list.

19. The method of claim 14, wherein the exception list is a variable length array indicating the physical addresses for respective LBAs, associated with a node included in the binary tree, that are associated with non-sequential physical addresses.

20. The method of claim 14, wherein each node, from the set of nodes, includes a validity bitmap indicating whether LBAs included in respective subsets of LBAs are included exception lists associated with respective nodes from the set of nodes.

* * * * *